(12) United States Patent
Garneau et al.

(10) Patent No.: US 8,215,241 B2
(45) Date of Patent: Jul. 10, 2012

(54) VERTICAL LINEAR ACTUATOR MECHANISM

(75) Inventors: François Garneau, Beloeil (CA); Matthieu Angers, La Prairie (CA); Christian Rivard, Saint-Barnabé-sud (CA)

(73) Assignee: MSB Design, Boucherville, Quebec (CA)

( * ) Notice: Subject to any disclaimer, the term of this patent is extended or adjusted under 35 U.S.C. 154(b) by 179 days.

(21) Appl. No.: 12/712,223

(22) Filed: Feb. 25, 2010

(65) Prior Publication Data

US 2011/0203496 A1    Aug. 25, 2011

(51) Int. Cl.
*A47B 85/00* (2006.01)
*A47B 9/00* (2006.01)
*F16M 11/00* (2006.01)
*F16M 13/00* (2006.01)
*A47F 5/00* (2006.01)
*E04G 25/00* (2006.01)
*F16H 1/20* (2006.01)

(52) U.S. Cl. .... 108/20; 108/147; 248/162.1; 248/354.1; 74/89.26

(58) Field of Classification Search .................. 108/147, 108/144.11, 20; 248/161, 162.1, 404, 414, 248/354.1; 74/89, 89.26, 89.13
See application file for complete search history.

(56) References Cited

U.S. PATENT DOCUMENTS

| | | |
|---|---|---|
| 2,862,689 A | 12/1958 | Dalrymple et al. |
| 3,866,548 A | 2/1975 | Skonieczny |
| 4,511,015 A | 4/1985 | Purdy |
| 4,577,821 A | 3/1986 | Edmo et al. |
| 4,635,565 A * | 1/1987 | Novak ........................... 108/147 |
| 4,875,660 A | 10/1989 | Gagnon et al. |
| 4,921,207 A * | 5/1990 | Baker ............................. 251/14 |
| 5,069,142 A | 12/1991 | Matre |
| 5,495,811 A * | 3/1996 | Carson et al. ................. 108/147 |
| 5,533,593 A | 7/1996 | Huang |
| 5,749,304 A * | 5/1998 | Turner ............................. 108/20 |
| 5,941,182 A | 8/1999 | Greene |
| 5,947,416 A | 9/1999 | Kraft |
| 6,182,583 B1 | 2/2001 | Larson |
| 6,398,164 B1 | 6/2002 | Fasse |
| 6,623,035 B1 * | 9/2003 | Schneider ................... 280/766.1 |
| 7,213,796 B2 | 5/2007 | Laforest |

(Continued)

FOREIGN PATENT DOCUMENTS

DE    1554256    11/1969

(Continued)

*Primary Examiner* — Darnell Jayne
*Assistant Examiner* — Andrew Roersma
(74) *Attorney, Agent, or Firm* — Norton Rose Canada LLP

(57) ABSTRACT

A vertical linear actuator mechanism for positioning a load at a desired elevation above a support surface is described. The vertical linear actuator mechanism in one aspect thereof comprises an electric motor having a drivable shaft. The drivable shaft is coupled to a linear extendable mechanism having a load connector at a top end thereof. A potentiometer detects the position of the load connector relative to the support surface and provides position signals to a motor controller circuit which monitors the position of the load connector and controls the operation of the electric motor. In another aspect thereof the vertical linear actuator is comprised by a pair of gas spring cylinders interconnected together. The vertical linear actuator mechanism is secured inside a telescopic pedestal and extends and retracts the pedestal.

12 Claims, 12 Drawing Sheets

U.S. PATENT DOCUMENTS

| | | | |
|---|---|---|---|
| 7,231,842 B2 * | 6/2007 | Biester et al. | 74/89.25 |
| 7,270,062 B1 | 9/2007 | Larson | |
| 7,383,778 B2 | 6/2008 | Dettmers | |
| 7,404,468 B2 * | 7/2008 | Kuo | 187/268 |
| 7,575,263 B2 | 8/2009 | Downey | |
| 8,070,127 B2 * | 12/2011 | Gethmann | 251/14 |
| 2005/0236534 A1 * | 10/2005 | Bondesen | 248/161 |
| 2008/0184828 A1 * | 8/2008 | Chen et al. | 74/25 |

FOREIGN PATENT DOCUMENTS

| | | | |
|---|---|---|---|
| EP | 360020 A1 * | 3/1990 | |
| EP | 577541 A1 * | 1/1994 | |
| FR | 1531473 | 7/1968 | |
| FR | 2373251 | 7/1978 | |
| WO | WO 8706439 A1 * | 11/1987 | |

* cited by examiner

FIG_4

VERTICAL LINEAR ACTUATOR MECHANISM

TECHNICAL FIELD

The present invention relates to a vertical linear actuator mechanism for positioning a load at a desired elevated position above a support surface. More particularly, but not exclusively, the load is comprised of a table top for use in a transport vehicle such as an aircraft, a train, or other passenger vehicles.

BACKGROUND ART

The vertical linear actuator mechanism of the present invention was conceived whereby to provide an extension assembly for raising and lowering a table top for use in an aircraft, train, or other passenger vehicles for the convenience of its occupants. Therefore, it is required that this table be adjusted to a comfortable level for use and be lowered to a position of non-use. A typical example of a floor rising cabin table is described in U.S. Pat. No. 5,947,416 wherein the table is connected to single pedestal and can be stowed under a floor surface when not required and then extended to a position of use to facilitate activities such as dining, paperwork, game playing, etc., as described therein. A major problem with such single pedestal tables is that the pedestals lack in strength, are not easily adjustable and not stable when raised to a position of use. Another disadvantage of such table assemblies is that they are normally operated by the electrical supply of the transport vehicle and when such supply is interrupted, such as during emergencies or other situation, the table cannot be lowered and could become a hazardous obstacle.

In U.S. Pat. No. 4,875,660 there is described a push actuator in the form of a telescopic tube which is sued as a lift actuator and which is constructed of two continuous bands of spring steel which are wound in a spiral and in a helix, respectively, with the turns of each band lying flat against each other in a retracted position of the tube. The turns of the respective bands are normal to one another. To extend the tube, the turns of the first band are spaced from each other and the turns of the second band are inserted between the space turns of the first band, so as to act as spacers for the latter turns. A mechanism causes extension and retraction of the tube. Such telescopic tubes have been developed for use in restricted spaces whereby to lift heavy loads and act as lifting jacks. A typical application of such telescopic tubes is to lift a floor section of a theatre scene wherein restricted space is provided under such floor section and therefore several of these lifting and retracting telescopic tubes are employed and positioned at different locations under the floor. These telescopic tubes have been developed for heavy duty work.

SUMMARY OF INVENTION

It is a feature of the present invention to provide a vertical linear actuator mechanism for positioning a load at a desired elevation above a support surface and wherein the linear actuator mechanism is adjustable at any position between a fully retracted position and a fully extended position.

Another feature of the present invention is to provide a vertical linear actuator mechanism for positioning a load at a desired elevation above a support surface and wherein the mechanism can be actuated in the absence of a power failure or under any emergency condition.

Another feature of the present invention is to provide a vertical linear actuator mechanism which is disposed inside and connected to a telescopic pedestal formed by two or more concentrically coupled cylinders and which pedestal and mechanism provides lateral and torsional flexural rigidity to the telescopic pedestal assembly.

Another feature of the present invention is to provide a vertical linear actuator mechanism which is driven by an electric motor and which is provided with position sensing means to control the motor whereby to position a load, such as a table top, to any desired position.

Another feature of the present invention is to provide a vertical linear actuator which is comprised of a pair of gas spring pistons interconnected together and extendable to position a load at a desired elevated position by a remote control device to arrest the pistons when the load reaches the desired elevation.

According to the above features, from a broad aspect, the present invention provides a vertical linear actuator mechanism for positioning a load at a desired elevation above a support surface. The vertical linear actuator mechanism comprises an electric motor having a drivable shaft. Coupling means interconnects the drivable shaft to a linear extendable mechanism having a load connector at a top end thereof. Position sensing means is provided to detect the position of the load connector relative to the support surface. The position sensing means provides position signals to a motor controller circuit which monitors the position of the load connector and controls the operation of the electric motor.

According to a further broad aspect of the present invention there is provided a vertical linear actuator mechanism for positioning a load at a desired elevation above a support surface. The linear actuator mechanism comprises a pair of extendable members which are secured to a common support assembly and disposed in parallel vertical relationship. Each of the extendable members has an extendable shaft which is secured at a free end thereof to a respective one of a base connector and a top connector. The top connector is securable to the load. The extendable shafts extend in opposite directions. A rigid connecting bar is secured to the base connector and to the top connector. Each of the connecting bars are displaced along a longitudinal axis thereof in unison with and parallel to an associated one of the extendable shafts of the pair of extendable members. An actuable lock mechanism is engageable with each of the connecting bars and immovably secured to the common support assembly whereby to immovably connect the connecting bars with the common support assembly to position the top connector and the load at the desirable elevation above the support surface.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
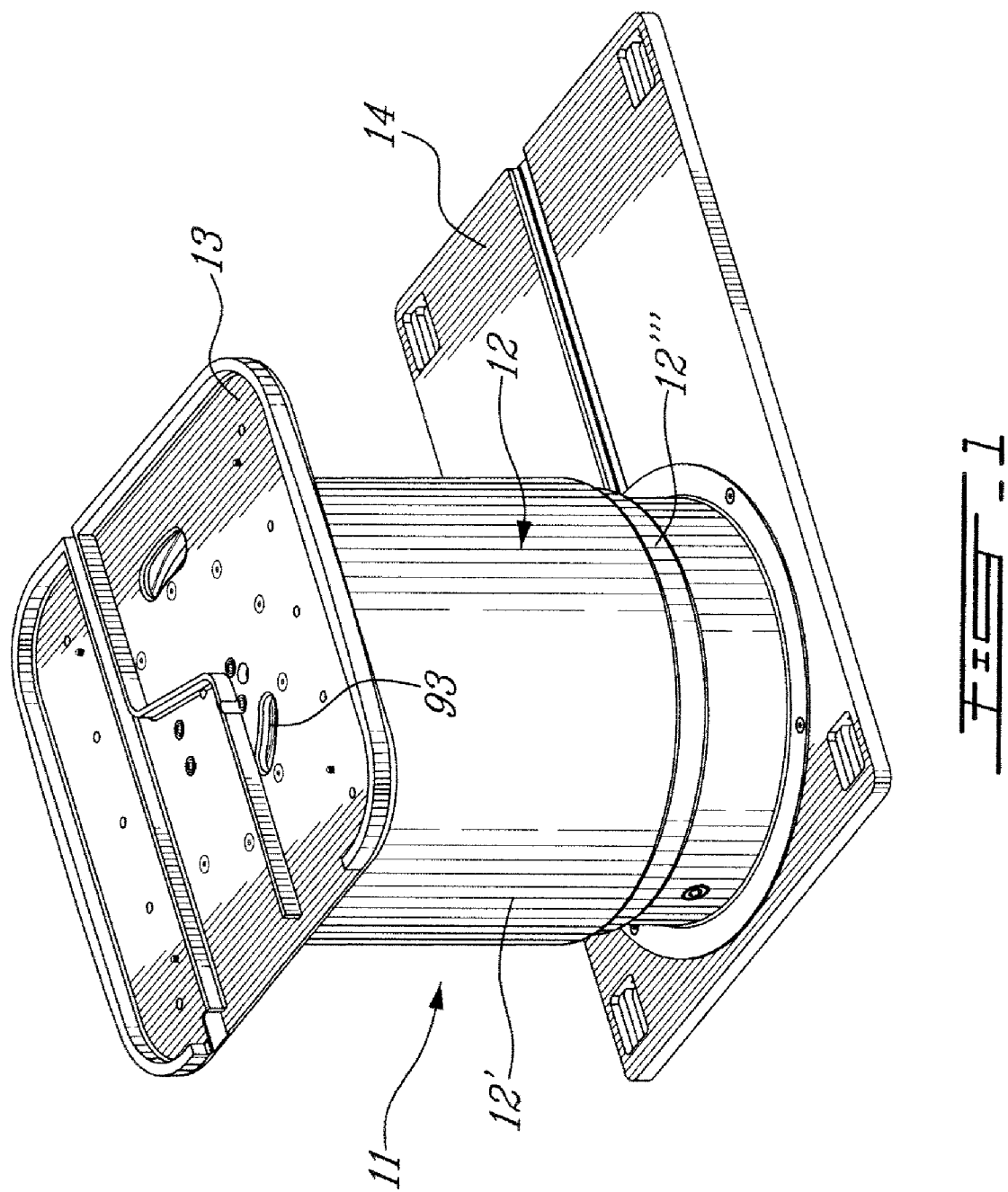
FIG. 1 is a perspective view of a telescopic pedestal, in a retracted position, and having secured therein either of the vertical linear actuator mechanisms as described herein whereby to position a load at a desired elevation from a floor surface.
Figure 2:
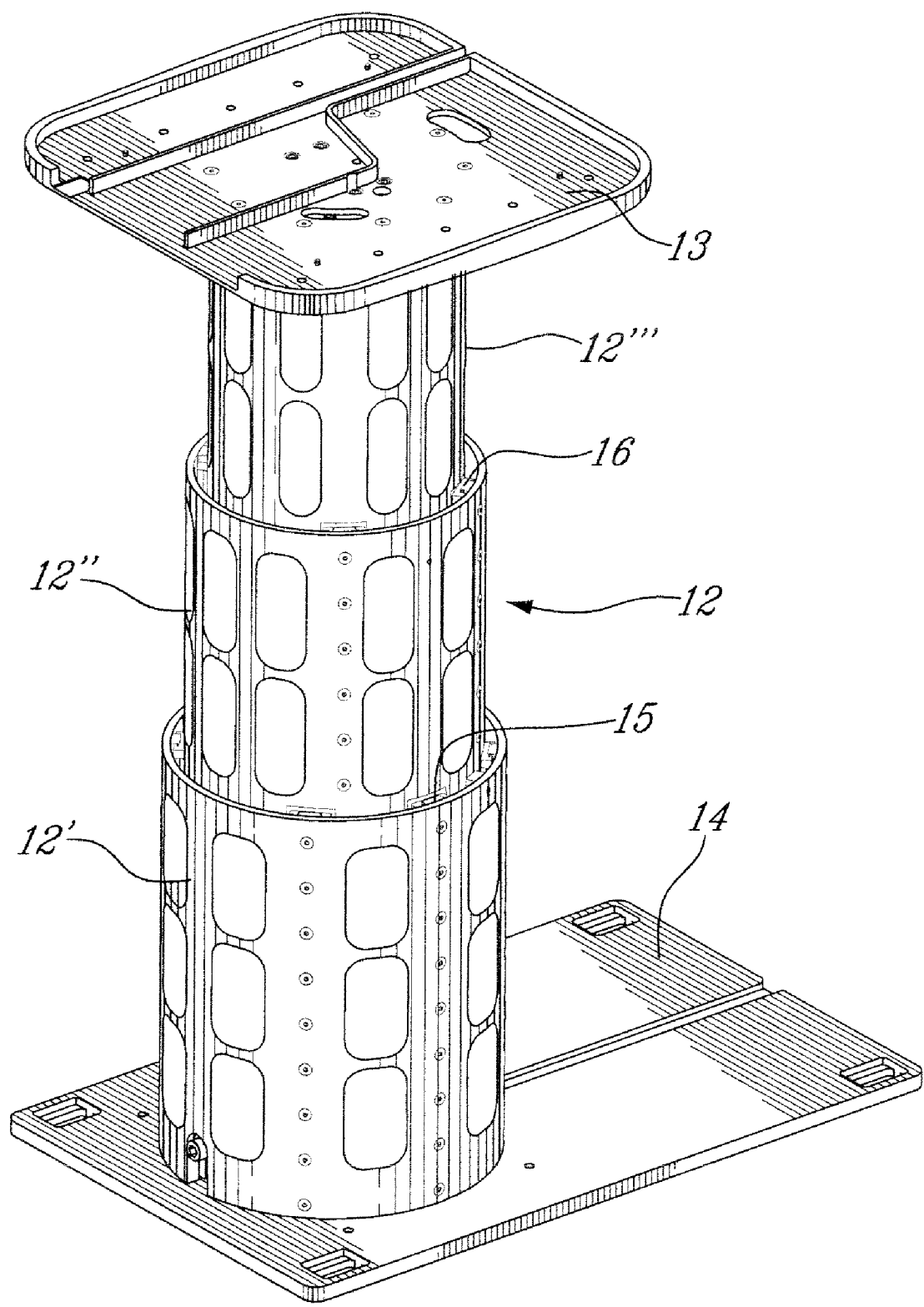
FIGS. 2 and 3 are perspective views showing the assembly of the telescopic pedestal.
Figure 3:
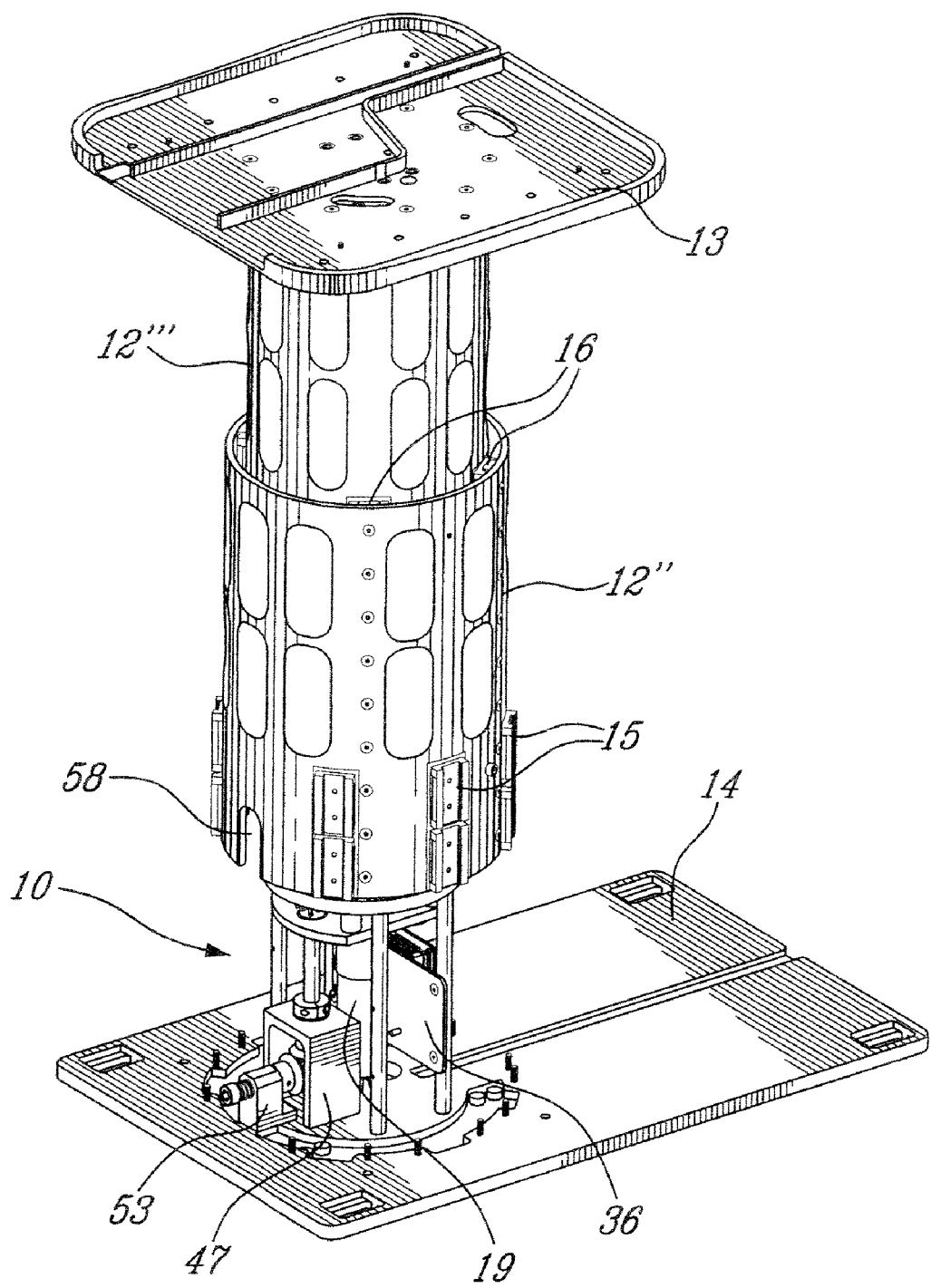
Figure 4:
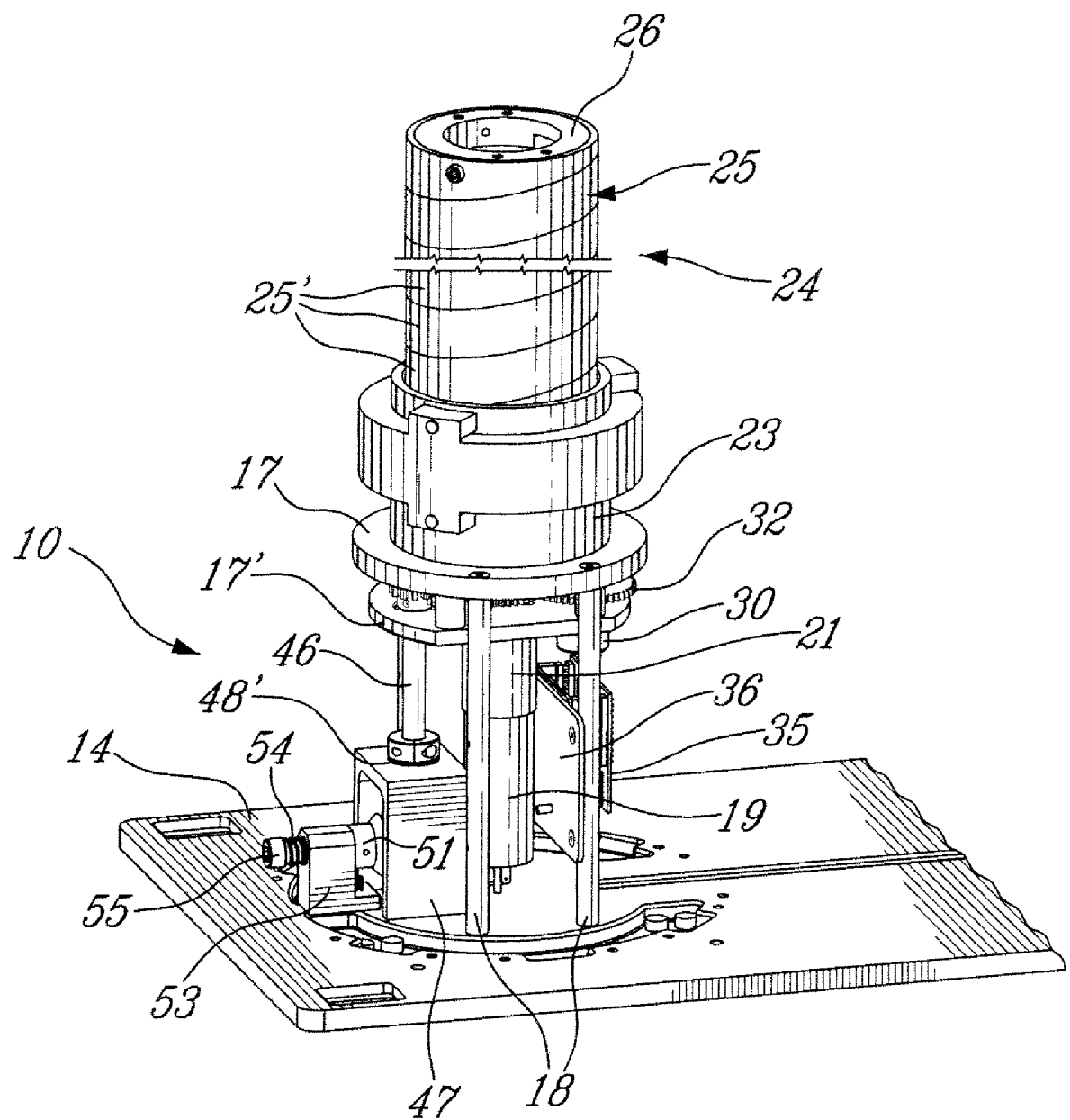
FIG. 4 is a perspective view showing the construction of a first embodiment of the vertical linear actuator mechanism of the present invention and wherein the mechanism is operated by an electric drive capable of extending and retracting a telescopic lift actuator tube formed of flexible metal bands to extend or retract the telescopic tube pedestal assembly illustrated in FIGS. 1 to 3.
Figure 6:
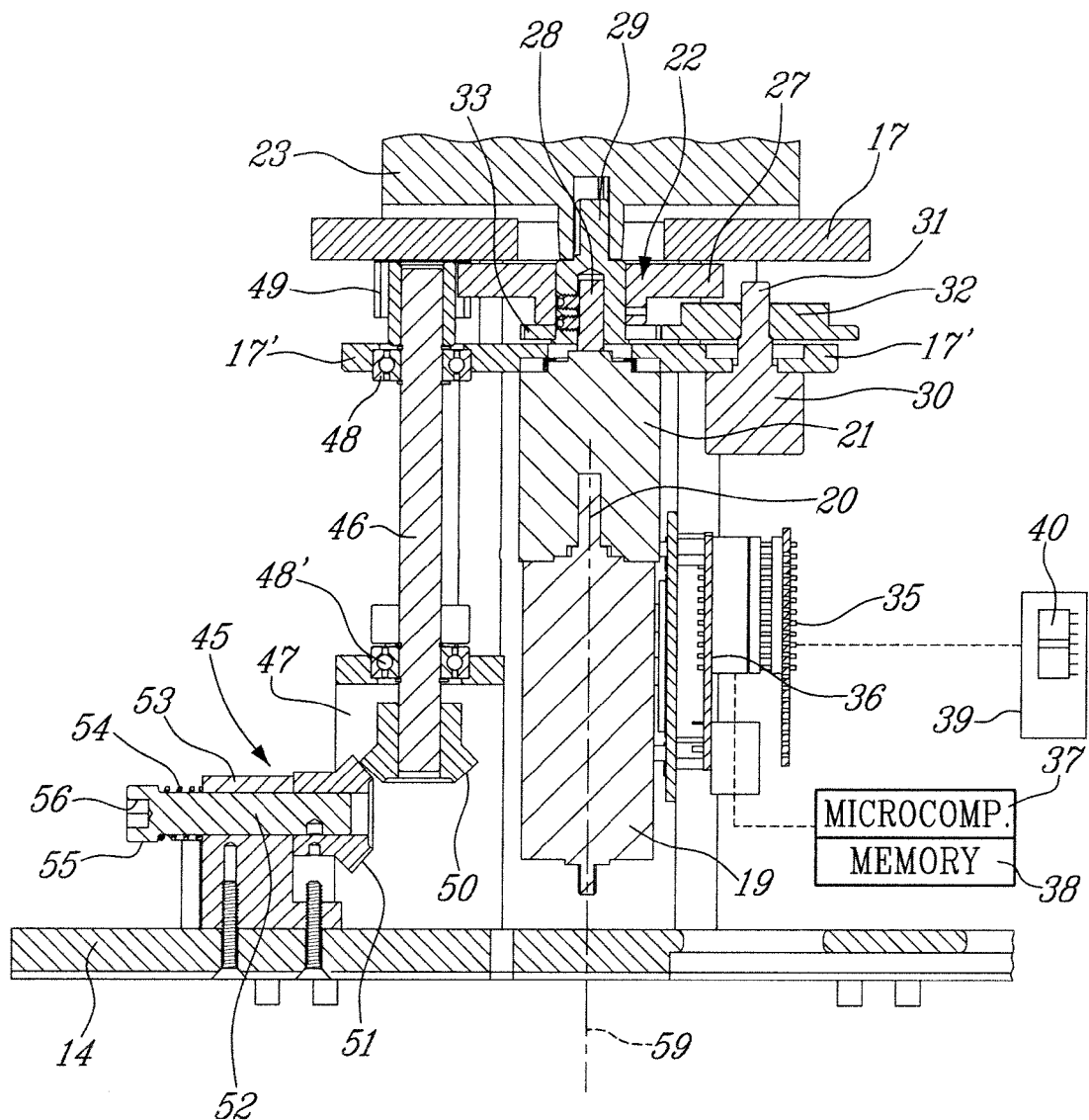
FIG. 6 is a further cross-section view of the vertical linear actuator mechanism of FIG. 5.
Figure 7:
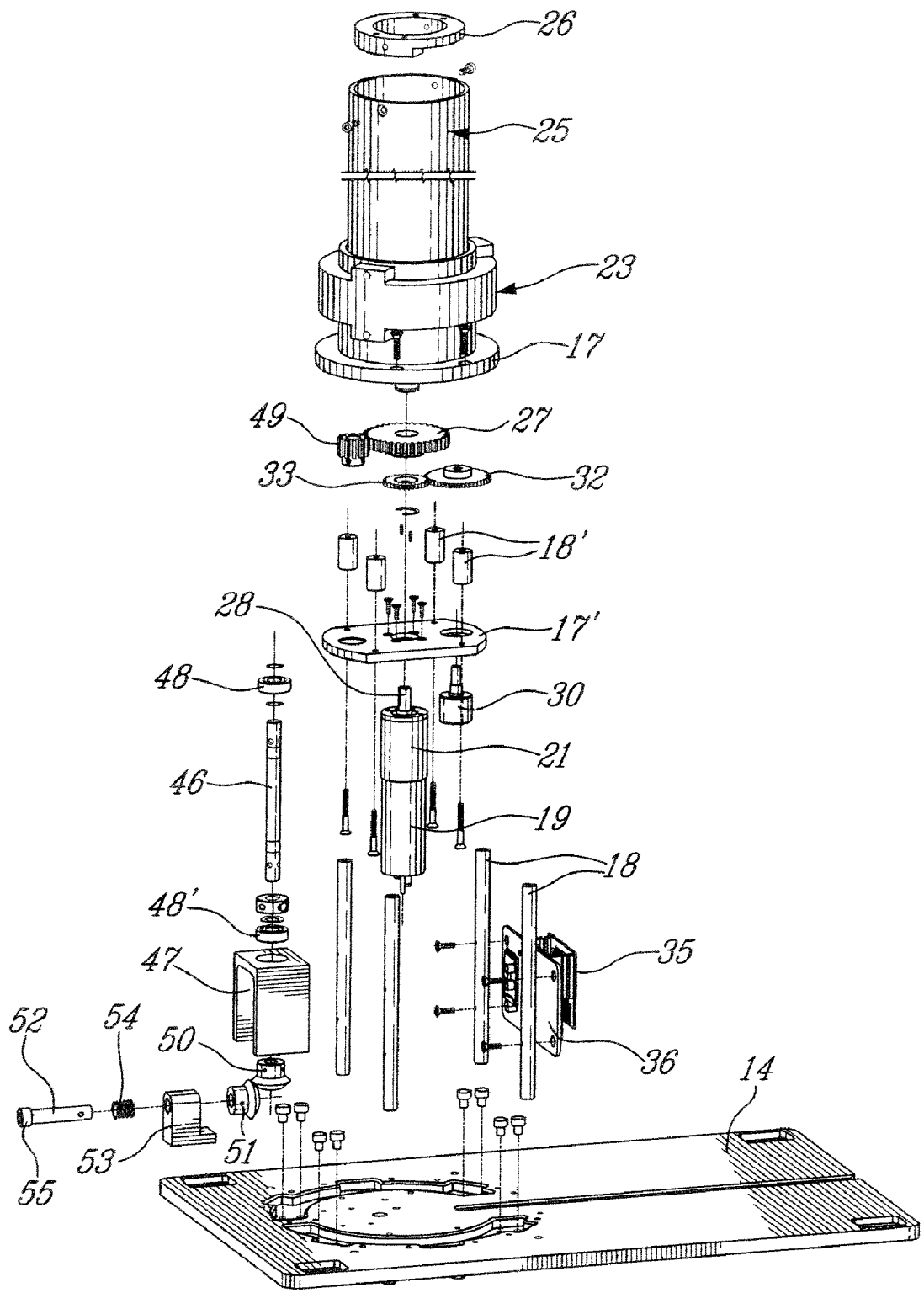
FIG. 7 is an exploded view showing the component parts of the vertical linear actuator mechanism of FIGS. 5 and 6.
Figure 8:
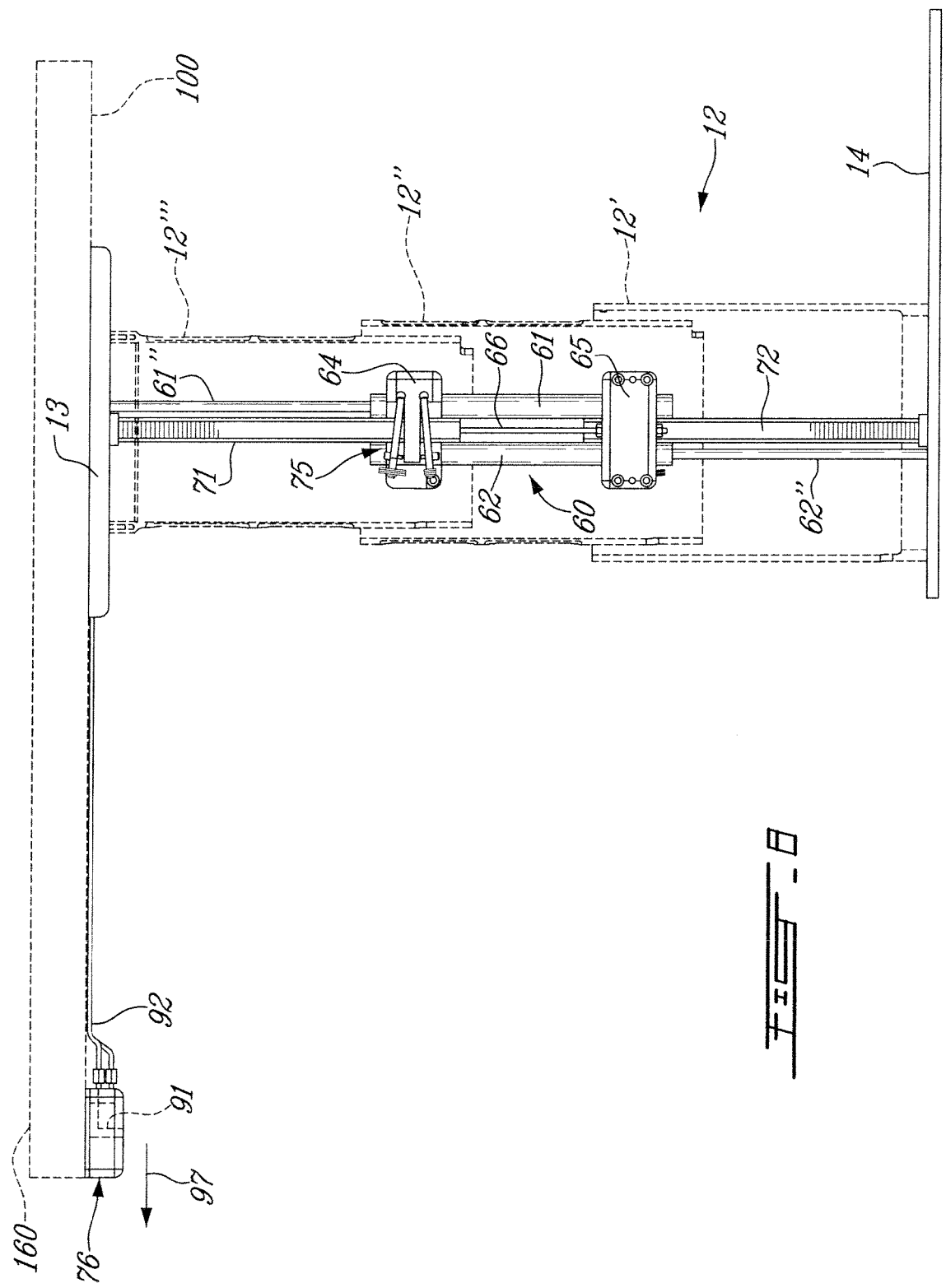
FIG. 8 is a side view showing a further embodiment of the vertical linear actuator mechanism of the present invention and which is comprised by a pair of gas spring pistons and connecting bars, the pistons providing for an outwardly biasing pushing force inside the telescopic pedestal and wherein a remote control device is utilized to arrest the displacement of the connecting bars to thereby arrest the extension of the gas spring pistons at desired positions, and wherein the telescopic pedestal is herein illustrated in a fully extended position.

Referring now to the drawings and more particularly to FIGS. 1 to 7, there will be described a first embodiment of the vertical linear actuator mechanism of the present invention. As shown in FIG. 3, the vertical linear actuator mechanism 10 of a first embodiment is disposed inside and connected to a telescopic pedestal assembly 12 formed by two or more, herein three, concentrically coupled cylinders 12', 12" and 12'''. The innermost one of the cylinders 12''' has a top plate 13 connected thereto. The top plate 13 constitutes a load connector to which may be secured a table top 100, such as illustrated in FIG. 8, or other loads such as a television which may be mounted in a cabinet and extendable thereout. Of course, many other load applications of the vertical linear actuator mechanism are contemplated. The outer and lowermost cylinder 12' is secured to a bottom plate 14 adapted to be connected to a floor or other support surface.

As shown in FIG. 3, the cylinders 12', 12" and 12''' are interconnected together by a vertically connected internal linear guide mechanism of a type well known in the art and comprised of linear guide rails 15 which are equipped with ball bearings (not shown) and adapted to interconnect with guide blocks 16 which are secured to one of the cylinders 12', 12" and 12''' disposed in facial relationship therewith. There are six linear guide rails 15 secured about the outer surface of the cylinder 12" for coupling with six guide blocks 16 provided on the inner surface of the bottom cylinder 12'. Four of these linear guide rails 15 are secured to the outer surface of the inner cylinder 12''' for engagement with four guide blocks secured to the inner surface of the intermediate cylinder 12". It can therefore be seen that these linear guide rails and guide blocks provide for a strong interconnection of the cylinders and provide for a telescopic pedestal assembly 12 which exhibits lateral and torsional flexural rigidity when the pedestal 12 is extended to any position.

Referring now more specifically to FIGS. 4 to 7, there will be described the construction and operation of the vertical linear actuator mechanism 10. As hereinshown, the linear actuator mechanism 10 is mounted on a frame which is comprised of support plates 17 and 17' elevated from the bottom plate 14 in spaced parallel relationship by support posts 18 and spacers 18' (see FIG. 7) which are secured to and between the plates 17 and 17' and to the bottom plate 14. The drive for the vertical linear actuator mechanism 10 is comprised by an electric motor 19 which has a drive shaft 20 as better illustrated in FIG. 6 which is connected to a planetary gear head 21. The planetary gear head 21 is coupled to a gear 22 which is secured to the spiralift rotating body 23 which operates a linear extendable mechanism 24, herein a spiralift, which is well known in the art and constituted by a telescopic tube 25 formed of flexible metal bands 25' wound in a spiral and in a helix. A load connector ring 26 is secured at a top end of the telescopic tube 25 and is secured to a load or the top plate 13 as shown in FIGS. 1 to 3 and to which a load is connectable.

The planetary gear head 21 provides a 79:1 reduction ratio with the electric motor and is coupled to a main gear 27 via its output shaft 28. The main gear 27 is secured to the shaft extension gear head 29 which is coupled to the spiralift rotating body 23. In order to control the position of a load connected to the load connector ring 26 with respect to a support surface to which the base plate 14 is secured, and in order to control the operation of the motor 19 to arrest its operation once the load connector ring has reached its fully extended or fully retracted position, there is provided a position sensing means in the form of a position control rotating potentiometer 30. The potentiometer 30 has a control shaft 31 having a reduction gear 32 secured thereto. The reduction gear 32 is in meshing toothed engagement with a coupling gear 33 secured to the shaft extension gear head 29. The gear reduction ratio of the reduction gear 32 is calculated to provide a correlation between the resistance of the potentiometer in relation to the position of the load connector ring 26 from a fully lowered position, shown in FIG. 5, to a fully elevated position, shown in FIG. 2 of the mechanism and hence the telescopic pedestal. The resistance value of the potentiometer constitutes position signals which are fed to a controller circuit 35. The controller circuit 35 monitors the position of the load connector ring 26 via the potentiometer value to control the operation of the electric motor 19 to position the load at a desired position.

The motor controller circuit 35 is provided with a mother board 36 incorporating therein a microcomputer 37 which has a computer readable memory 38 having recorded therein statements and instructions relating to a low and a high reference position signals. Accordingly, the controller circuit 35 can stop the electric motor 19 at substantially the fully lowered position and the fully elevated position by monitoring the potentiometer value signals, herein the position signals. A remote control device 39 may also be provided whereby to send control command signals to the controller circuit 35 for positioning the load at a desired position relative to the support surface to which the bottom plate 14 is secured. The remote controller 39 is also provided with positioning selector means 40 to effect this selection.

In the event of a power failure wherein the electric motor 19 is no longer operable through an electrical supply, not shown herein but obvious to a person skilled in the art, there is provided a drive override means 45 constituted by a gearing assembly. The drive override gearing assembly 45 is coupled to the main gear 27. It is comprised of an override shaft 46 which is supported between the support plate 17' and a support bridge 47 secured to the bottom plate 14. The override shaft 46 is supported by bearings 48 and 48'. The top end of the override shaft 46 is provided with an override gear 49 in toothed meshing engagement with the main gear 27. The bottom end of the override shaft 46 has a beveled drivable gear 50 secured thereto.

A drive gear, herein beveled gear 51, is supported on a drivable gear shaft 52 which is axially displaceable by a support member 53 immovably secured to the bottom plate 14. The drivable gear shaft 52 is normally biased axially at a disengaged position by a compression spring 54 retained captive about the drivable gear shaft between the support member 53 and an enlarged drive tool engaging rear end 55 of the gear shaft 52. The drive tool engaging free end 55 is provided with a socket bore 56 for engagement by a power or manual tool drive bit, not shown herein but obvious to a person skilled in the art. Therefore, in order to impart rotation to the override shaft 46, the power or manual tool drive bit is positioned in the socket bore 56 and the user person applies a pushing force on a drive tool to which the bit is secured whereby the beveled drive gear 51 is placed in engagement with the beveled drive gear 50 of the override shaft thus imparting rotation to the shaft 46 and gear 49 causing rotation to the main gear 27 and displacement of the spiralift rotating body 23 thus extension or retraction of the telescopic tube 25 and the telescopic pedestal assembly secured thereabout.

Figure 5:
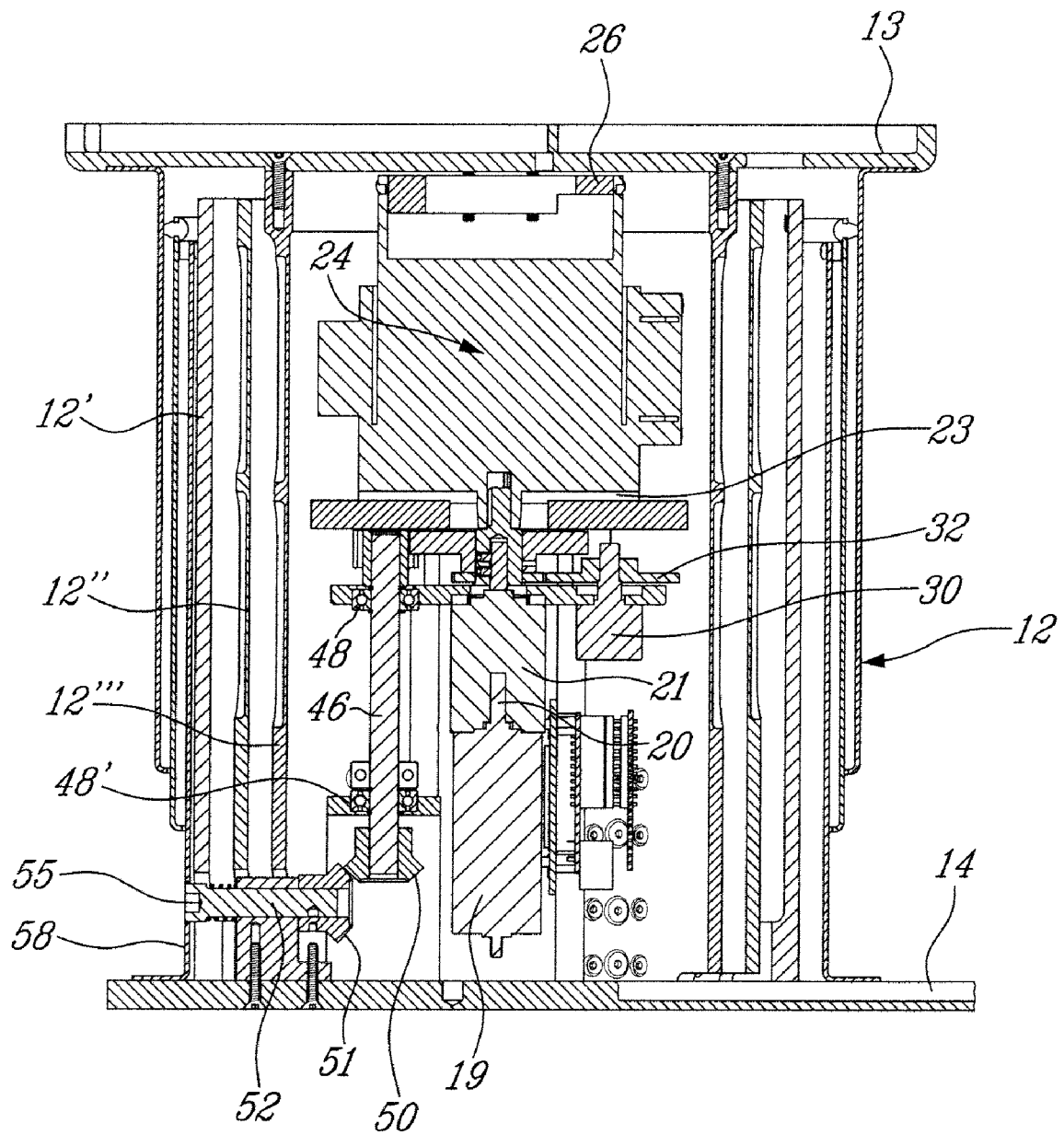
FIG. 5 is a section view of the vertical linear actuator mechanism of FIG. 4 and showing the connection thereof with the telescopic tubes of the pedestal disposed thereabout.

As clearly shown in FIG. 6, the electrical motor is supported on a central longitudinal axis 59 with its drive shaft 20 and the output shaft 28 of the planetary gear head also lying on this axis. The motor 19 is suspended on its drive shaft 20 immovably coupled to the gear head assembly 21. The main gear 27 is secured concentrically about this axis. Accordingly, this results in a compact structure which can fit inside the telescopic pedestal 12. As shown in FIG. 7, the output shaft is modified to be directly coupled to the rotating body 23 doing away with the shaft extension gear head 29. As also shown in FIGS. 3 and 5, the telescopic cylinders 12' and 12" and 12''' are provided with an inverted U-shaped bottom opening 58 to provide access to the socket bore 56 of the drivable gear shaft 52.

Figure 9:
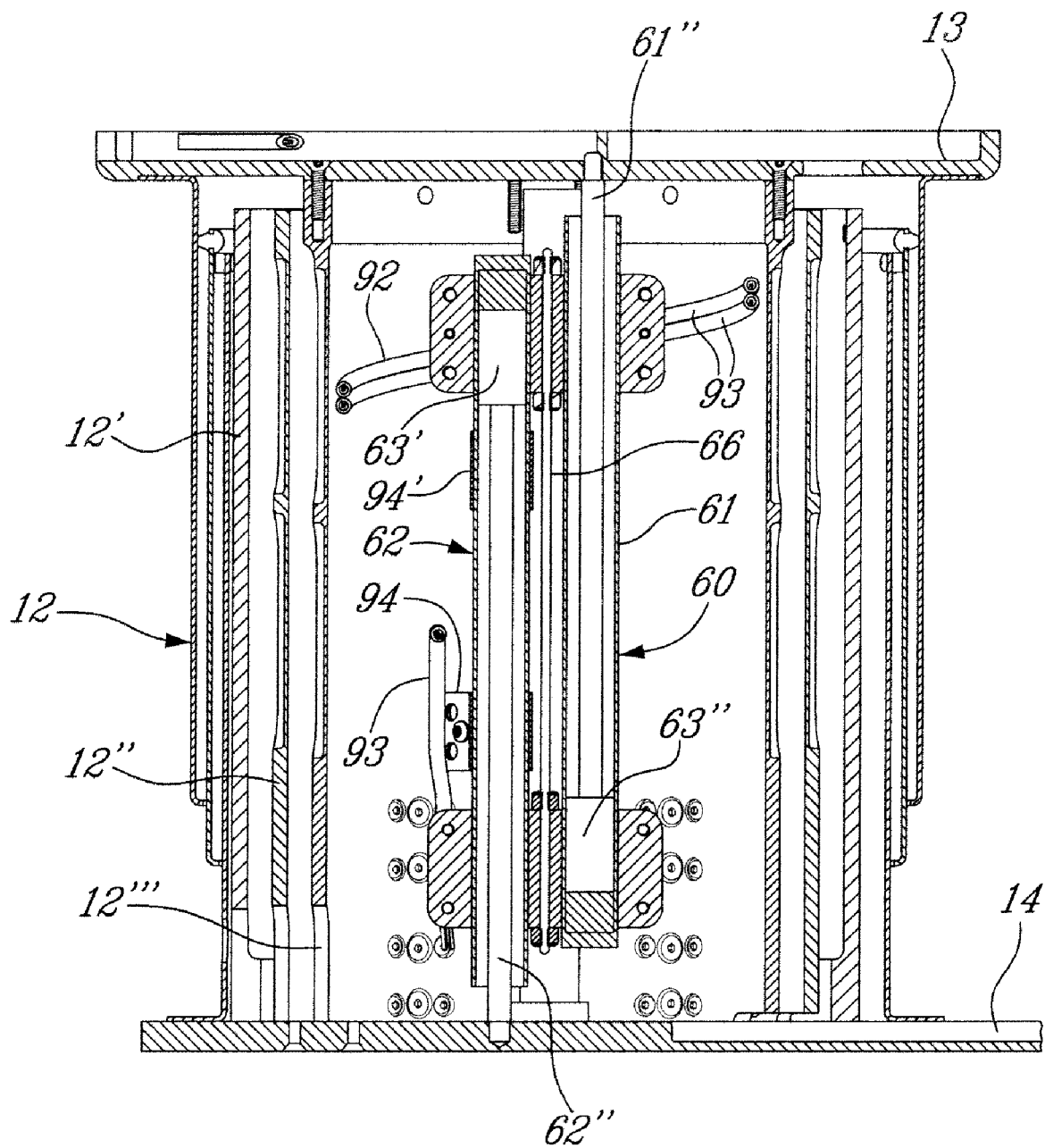
FIG. 9 is an enlarged cross-section view showing the construction of the vertical linear actuator mechanism of FIG. 8 and wherein the telescopic pedestal is shown in a fully retracted position.

Referring now to FIGS. 8 to 13, there will be described the construction and operation of a second embodiment of the vertical linear actuator mechanism, herein a manual linear actuator 60. As shown in FIG. 8, the linear actuator 60 is mounted vertically inside the telescopic pedestal 12 which is herein shown in phantom lines in its fully extended position with the telescopic tubes 12', 12" and 12''' fully extended. FIG. 9 shows the linear actuator mechanism 60 in its fully retracted position.

Figure 10:
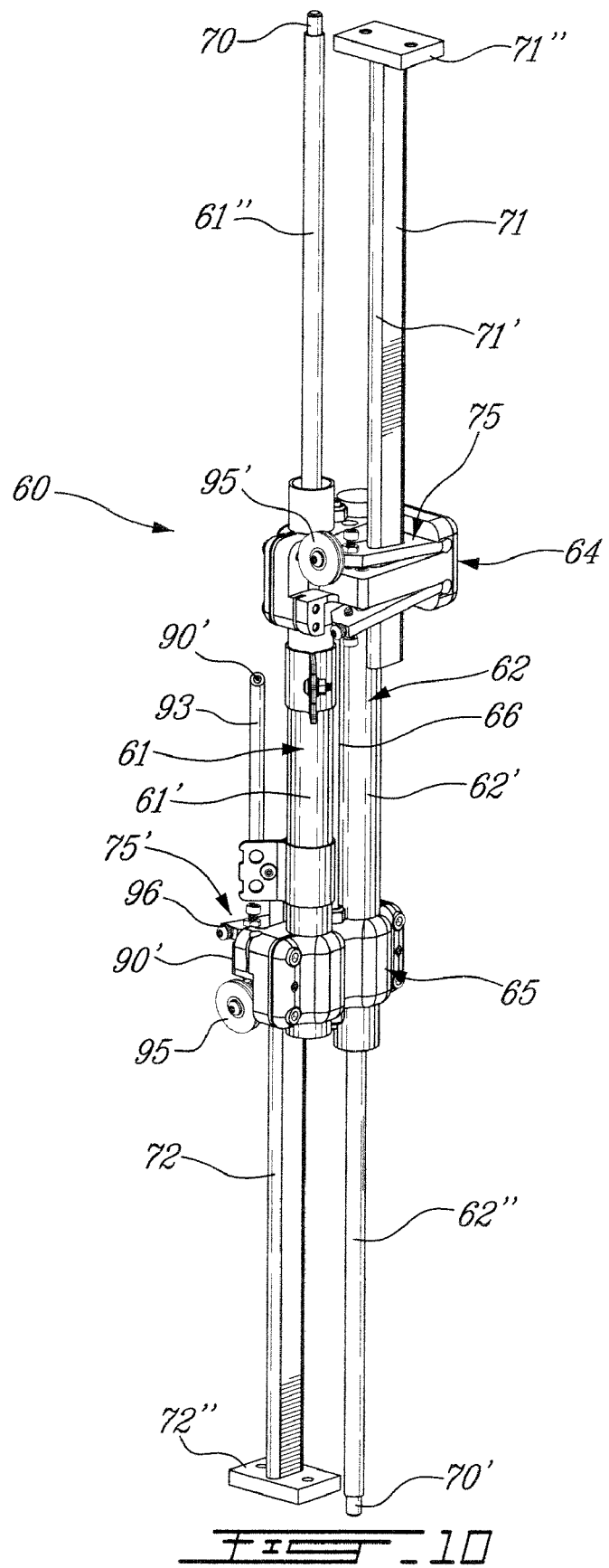
FIG. 10 is a further enlarged perspective view of the vertical linear actuator mechanism of FIGS. 8 and 9 showing its associated parts.
Figure 11:
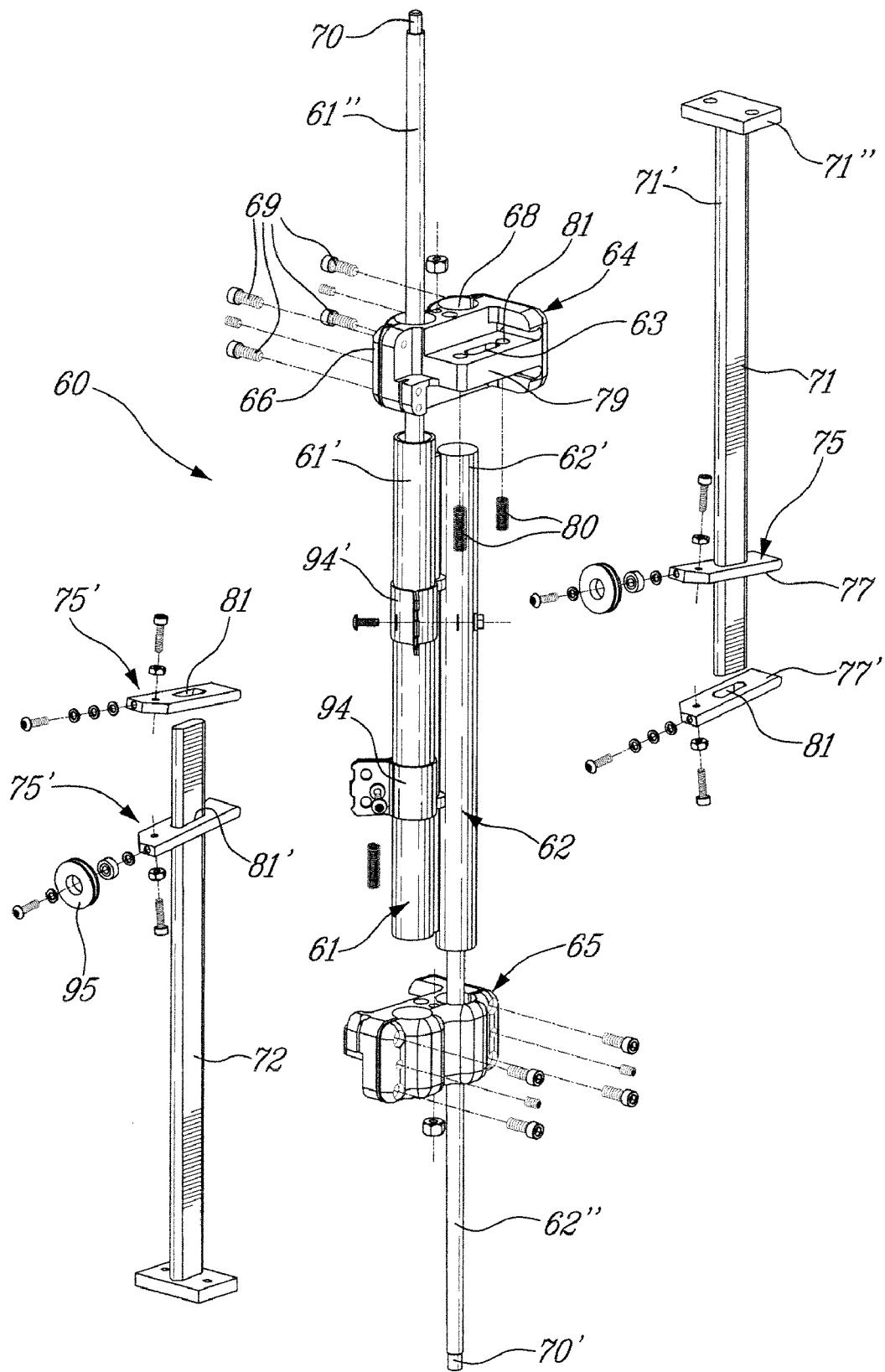
FIG. 11 is an exploded view of FIG. 10 showing the construction parts of the vertical linear actuator mechanism utilizing gas spring pistons and connecting bars.

As better illustrated in FIGS. 9 to 11, the vertical linear actuator mechanism 60 is comprised by a pair of extendable members, herein a pair of gas spring cylinders 61 and 62. Each of the cylinders has a cylinder housing 62' and 61', respectively, each having piston rods 62" and 61", respectively. The piston rods 61" and 62" constitute extendable shafts which are biased outwardly of their cylinder housings 61' and 62', respectively, by a biasing pushing force exerted by gas and oil retained captive under pressure inside the cylinders, as is well known in the art. The piston rods 61" and 62" have piston heads 63' and 63" secured inside the cylinder and displaceable by pressure.

Figure 13:
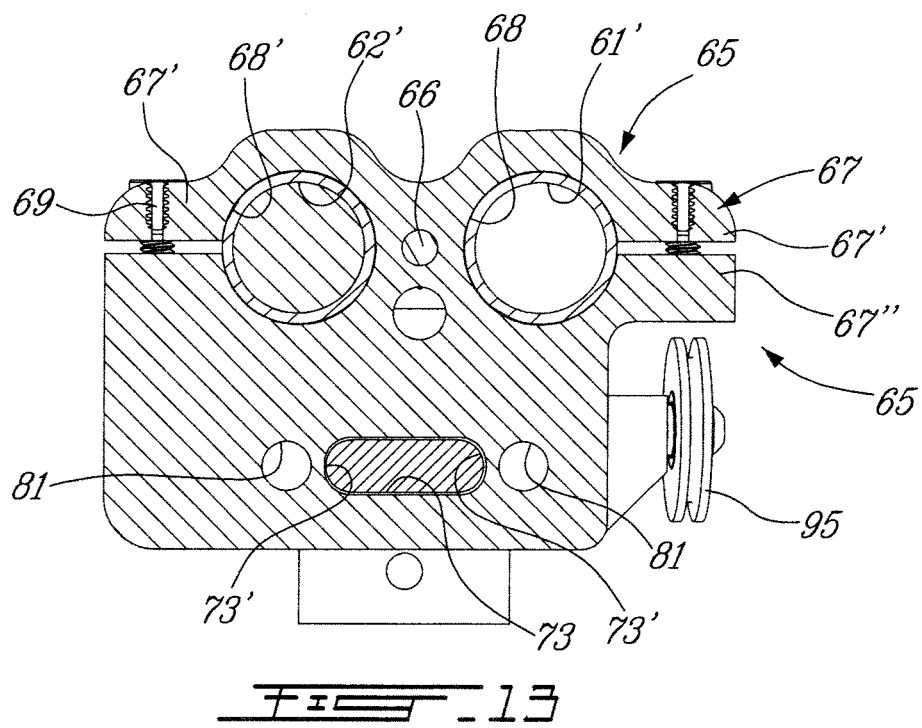
FIG. 13 is a cross-section view of a connector block which is used to immovably secure the piston cylinders together in parallel side-by-side relationship.

As shown in FIGS. 9 and 10, the gas spring cylinder housings 61' and 62' are clampingly engaged between a pair of connector blocks 64 and 65 which are interconnected together and immovably secured between one another in spaced-apart relationship by an adjustable connecting rod 66. The connector blocks 64 and 65 have a clamping section 67, as shown in FIG. 13, which delineates opposed clamping shoulders 67' and 67" which provide limited flexion permitting the cylinders 62' and 61' to be received in respective cylindrical bores 68 and 68'. Clamping screws 69 apply the clamping force to immovably connect the cylinders in the bores 68 and 68' of the blocks.

As shown in FIG. 9, the free end of the piston rods 61" and 62" are threaded to provide end connectors 70 and 70'. End connector 70 of piston rod 61" is secured to the top plate 13 while the end connector 70' of piston rod 62' is secured to the bottom plate 14. Thus, the piston cylinders 61' and 62' are inversely secured between the connector blocks and apply a downward and upward pushing force between the top plate 13 and the bottom plate 14. In order to arrest this pushing force to desirable extended positions of the piston rods, there is provided a pair of rigid connecting bars, namely bar 71 and bar 72 secured respectively to the underside of the top plate 13 and the top side of a bottom plate 14 by attachment plates 71" and 72". These connecting bars 71 and 72 extend through respective slots 73 formed through the connecting blocks 64 and 65. This slot 73 is better illustrated in FIG. 13. The bars are displaced along a longitudinal axis thereof and in unison and parallel to an associated one of the extendable shafts, herein the piston rods 61" and 62" of the piston cylinders. In order to arrest a displacement of these piston rods, and accordingly the position of the top plate 13 with respect to the bottom plate 14, there is provided an actuable lock mechanism 75 and 75' associated with connecting bars 71 and 72, respectively, whereby to position the top plate 13 and a load connected thereto at a desirable elevation above a support surface to which the bottom plate is secured. The actuable lock mechanisms 75 and 75' are identical clamping mechanisms and are each spring-biased against a respective one of these rigid connecting bars and is actuable by a remote control means, herein a hand grip lock actuator 76.

Figure 12:
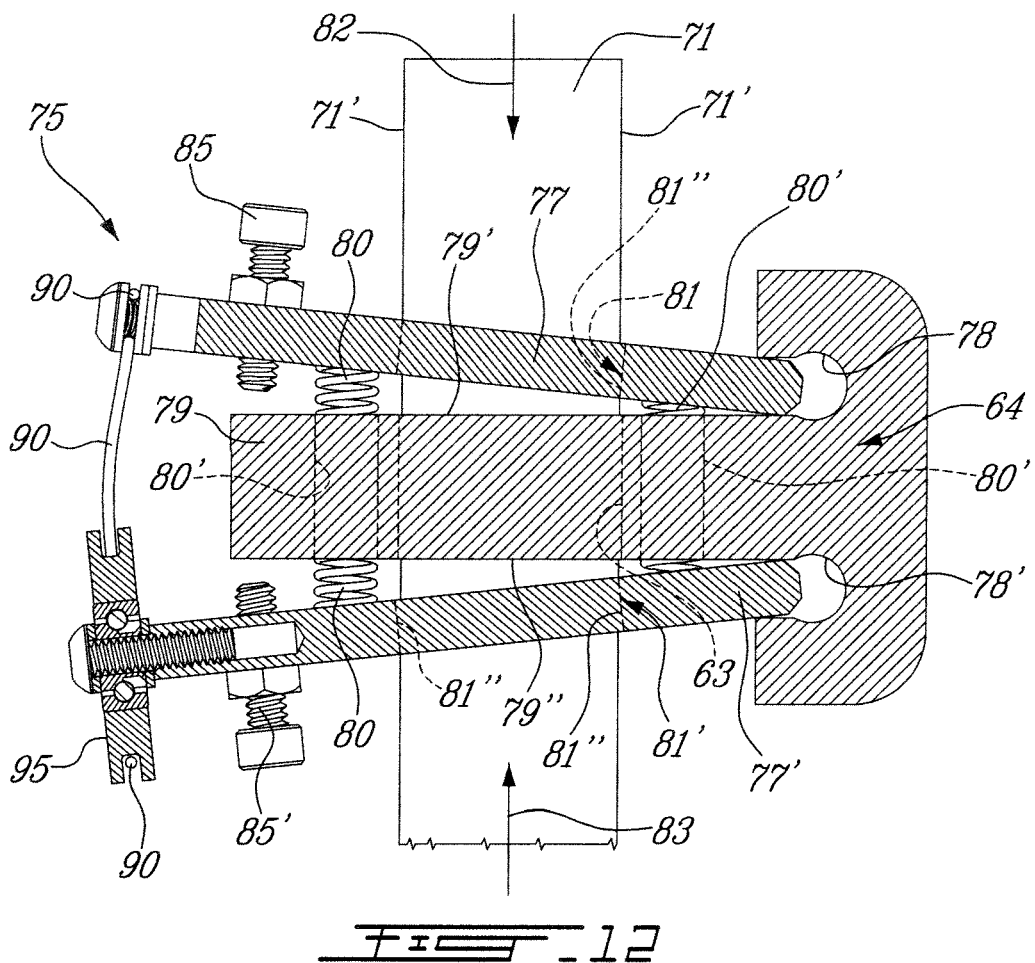
FIG. 12 is an enlarged section view showing the construction of the actuable locking mechanism.

As better illustrated in FIG. 12, each clamping lock mechanism is constituted by a pair of locking plates 77 and 77'. The locking plates are each received in pivot slots 78 and 78', respectively, formed in the connector blocks 64 and 65. As shown in FIG. 12, the pair of locking plates are retained spaced apart at a common end in a respective one of the pivot slots 78 and 78' located on opposed sides of a support block section 79 formed integrally with the connector blocks. The support block section 79 has a guide slot 73 through which its associated connecting bar 71 extends in loose sliding fit. Spring biasing means, constituted by a pair of helical compression springs 80 retained captive in respective through bore 80' formed in the support block section 79. The compression spring 80 extends from opposed ends of the bores 80' and abut against the pair of locking plates 77 and 77' urging the plates in opposite outward directions from their pivot slots 78 and 78'.

The locking plates 77 and 77' are also provided with locking slots 81 and 81', respectively, through which the locking bar 71 extends in loose sliding fit and spaced from opposed end walls thereof a slight distance to permit angular displacement of the locking plates, as shown in FIG. 12. When the locking plates are urged outwardly, as shown in FIG. 12, the locking slot 81, in each of the plates, frictionally engages locking bar 71 above and below the support block section 79 preventing displacement of the locking bar 71 in either a downward direction, as indicated by arrow 82, or in an upward direction, as indicated by arrow 83. As herein illustrated, the locking slot 81 is in frictional engagement with the outer side walls 71' of the locking bar due to the angular displacement of the locking plates 77 and 77'. As hereinshown locking plate 77 is in frictional engagement at its top left hand corner and bottom right hand corner of its opposed end walls 81" of its locking slot 81. Bottom locking plate 77' has its locking slot 81' in frictional engagement at its bottom left hand corner and top right hand corner to arrest displacement in the direction of arrow 83. A pair of set screws 85 and 85' are threadably connected to a respective one of the locking plates 77 and 77' whereby to adjust the downward angular displacement of these plates with respect to adjacent surfaces 79' and 79" of the support block section 79. This displacement is adjusted whereby the connecting bars 71 and 72 are freely displaceable through the locking slots 81 and 81' in the locking plates 77 and 77'.

In order to cause pivoting displacement of the locking plates 77 and 77', there is provided a remote hand grip lock actuator 76, as shown in FIG. 8, whereby to apply a pulling force on two actuable cables 90 and 90', one cable 90 herein shown in FIG. 12. The hand grip lock actuator 76 is secured under an end of a table top 100 and provided with a finger gripping member 91 which is connected to a pair of Bowden cables 92 having a respective one of the cables 90 and 90' displaceably retained therein. The cables 92 are disposed inside the telescopic pedestal 12, as shown in FIG. 9, and enter into the pedestal from the hole 93 provided in the top plate 13, see FIG. 1.

As shown in FIG. 9, the cables 92 follow a helical path within the telescopic pedestal to compensate for the expansion of the pedestal. The Bowden cables 92 have an outer protective conduit 93 and the actuable cables 90 and 90' are located therein. The conduits 93 are immovably secured in connecting brackets 94 and 94' which are secured about one of the cylinders, cylinder 61' as shown in FIG. 10, and at a location in proximity to associated guide pulleys 95 and 95', only one shown in FIG. 10, and secured to the end of one of the locking plates, herein locking plate 77' of the actuable lock mechanism 75 shown in FIG. 12. As shown in FIG. 10, the actuable cable 90 exits the end of the Bowden cable outer conduit 93 and is trained about the guide pulley 95 and then immovably secured taut at a free end 90' to a screw attachment 96. Both actuable cables 90 and 90' are connected the same way to actuate their associated pair of locking plates. Accordingly, it can be seen that when the finger grip member 91, as shown in FIG. 8, is pulled in the direction of arrow 97, it will apply a pulling force on both actuable cables 90 and 90' causing the locking plates 77 and 77' of each lock mechanism 75 and 75' to move closer to one another, thereby releasing the locking engagement of the plates with their associated connecting bars 71 and 72 permitting the piston rods 61" and 62" to extend causing the top plate 13 to move upwardly in a smooth displacement as the piston rods extend from their respective cylinders. In order to stop the deployment of the telescopic pedestal, it is only necessary to release the finger gripping member 91 of the hand grip lock actuator 76, which is spring biased releasing the pull on the cables 90 and 90' thereby causing the locking plates to move away from one another by the action of the compression spring 80 thereby locking the connecting bars 71 and 72 against a downward force and an upward force as indicated by arrows 82 and 83 in FIG. 12. Thus, the position of the top plate, that is to say the table top 100 can be adjusted.

In order to lower the table top to a desired position it is merely necessary to pull on the finger gripping member 91 to release the locking plates from their associated connecting bars to apply a downward pushing force on the table top with the user's hand until the table top is fully retracted or lowered to a desirable position. Once that position is attained the finger gripping member 91 is released and the locking plates of both actuable lock mechanisms are automatically engaged. It is pointed out that the connector blocks 64 and 65 are identical to one another as well as the actuable lock mechanisms and associated guide pulley and only one of these has been described in more detail herein.

It is within the ambit of the present invention to cover any obvious modifications of the preferred embodiments described herein, provided such modifications fall within the scope of the appended claims.

We claim:

1. A vertical linear actuator mechanism for positioning a load at a desired elevation above a support surface, said vertical linear actuator mechanism comprising an electric motor having a drivable shaft, a gear assembly coupling interconnecting said drivable shaft to a linear extendable mechanism having a load connector at a top end thereof, a position sensing gear coupled to said gear assembly coupling to detect the position of said load connector relative to said support surface, said position sensing gear providing position signals to a motor controller circuit which monitors the position of said load connector and controls the operation of said electric motor, a drive override means coupled to said gear assembly coupling to impart a drive to said gear assembly coupling to operate said linear extendable mechanism in the absence of power supply to said electric motor, said drive override means having an override shaft gear coupled to said gear assembly coupling, said override shaft gear having a drivable gear secured thereto, and a drive gear supported for disconnectable engagement with said drivable gear, said drive gear being normally biased at a disengaged position with respect to said drivable gear, and external drive means to impart a pushing force to engage said drive gear with said drivable gear and a rotational force to impart a rotation to said override shaft and said pear assembly coupling to displace said load relative to said support surface.

2. A vertical linear actuator mechanism as claimed in claim 1 wherein said position sensing gear is connected to a potentiometer having a control shaft, said control shaft being connected to the position sensing gear coupled to said gear assembly coupling.

3. A vertical linear actuator mechanism as claimed in claim 2 wherein said gear of said control shaft is dimensioned to provide a gear reduction ratio calculated to provide a correlation between the resistance of said potentiometer and the position of said load connector from a fully lowered position to a fully elevated position, said position signals indicating the actual position of said coupling means.

4. A vertical linear actuator mechanism as claimed in claim 3 wherein said motor controller circuit is provided with a microcomputer incorporating a computer readable memory having recorded therein statements and instructions relating to a low and a high reference position signal whereby said motor controller circuit can stop said motor at substantially said fully lowered position and said fully elevated position.

5. A vertical linear actuator mechanism as claimed in claim 4 wherein there is further provided a remote control having inputting means for providing instruction signals to said controller circuit to control said motor for positioning said load connector and hence said load at a desired position relative to said support surface.

6. A vertical linear actuator mechanism as claimed in claim 2 wherein said gear assembly coupling has a shaft extension gear head secured to a rotatable body of said linear extendable mechanism to impart rotation to said linear extendable mechanism.

7. A vertical linear actuator mechanism as claimed in claim 6 wherein said electric motor is supported on a central longitudinal axis with said drivable shaft extending on said axis, a gear box secured to said drivable shaft, said gear box having a gear box drive shaft extending on said axis and secured to said shaft extension gear head, a main gear secured concentrically about said shaft extension gear head, and a potentiometer control shaft gear coupled to said shaft extension gear head.

8. A vertical linear actuator mechanism as claimed in claim 1 wherein said vertical linear actuator mechanism is disposed inside and connected to a telescopic pedestal formed by two or more concentrically coupled cylinders, said load connector being secured to a top end of one of said cylinders, said cylinders being interconnected by a vertically connected internal linear guide mechanism to provide lateral and torsional flexural rigidity to said telescopic pedestal.

9. A vertical linear actuator mechanism as claimed in claim 1 wherein said linear extendable mechanism is a telescopic tube formed of flexible metal bands wound in a spiral and in a helix.

10. A vertical linear actuator mechanism as claimed in claim 1 wherein said load is a table top, said load connector being a connector plate secured to an underside of said table top.

11. A vertical linear actuator mechanism as claimed in claim 1 wherein said drive gear is a beveled gear supported on a gear shaft axially displaceable in a support member, a compression spring retained captive about said gear shaft to position said drive gear at said disengaged position, said gear shaft having a drive tool engaging free end for coupling said external drive means thereto.

12. A vertical linear actuator mechanism as claimed in claim 11 wherein said drive tool engaging free end is constituted by a socket bore formed in said free end of said gear shaft for engagement by a power tool drive bit.

* * * * *